United States Patent [19]

Takekoshi

[11] 4,414,235

[45] Nov. 8, 1983

[54] PROCESS FOR PREPARING INSTANT MACARONIS

[76] Inventor: Shukuko Takekoshi, No. 39-1, Mitsuishi Aza-Minamiote, Naruto-cho, Naruto-shi, Tokushima, Japan, 772

[21] Appl. No.: 253,839

[22] PCT Filed: Aug. 21, 1980

[86] PCT No.: PCT/JP80/00190

§ 371 Date: Apr. 22, 1981

§ 102(e) Date: Apr. 15, 1981

[30] Foreign Application Priority Data

Aug. 22, 1979 [JP] Japan ............................ 54-108270

[51] Int. Cl.³ .............................................. A23L 1/16
[52] U.S. Cl. ................................... 426/557; 426/302; 426/451; 426/504
[58] Field of Search ............... 426/557, 451, 305, 302, 426/504

[56] References Cited

U.S. PATENT DOCUMENTS 3,892,874  7/1975  Ando ................................. 426/557
4,230,735 10/1980  Yoshida et al. ..................... 426/557

FOREIGN PATENT DOCUMENTS 49-29259  4/1974  Japan ................................. 426/557

Primary Examiner—Raymond N. Jones
Assistant Examiner—Elizabeth A. Hatcher
Attorney, Agent, or Firm—Armstrong, Nikaido, Marmelstein & Kubovcik

[57] ABSTRACT

A process for preparing instant macaronis which comprises adding an egg white, a yam and an aqueous soution of a carbonate as a first kneading water to a wheat flour, half-kneading and aging the obtained mixture, further adding an aqueous solution of an organic acid as a second kneading water and kneading the mixture, molding it into a desired shape, boiling the molded alimentary paste in an aqueous solution of common salt, surface-treating the boiled alimentary paste with a solution of glucose in an alcohol-water mixed solvent, and freeze-drying the treated alimentary paste. The instant macaronis can be rehydrated to macaronis having excellent taste, texture and color tone in a short period of time by merely pouring a boiling water on the macaronis.

5 Claims, No Drawings

PROCESS FOR PREPARING INSTANT MACARONIS

TECHNICAL FIELD

The present invention relates to a process for preparing instant macaronis capable of easily rehydrating in a short period of time without impairing flavor, texture, color tone and the like of macaronis of fine quality.

BACKGROUND ART

Macaronis are called, depending on the shape, macaroni, spaghetti, vermicelli, noodle, elbow, alphabet, cross, star, ring, shell and the like. As a main raw material thereof, semolina of durum wheat is originally employed, but in general an ordinary wheat flour rich in gluten has been employed. Macaronis are prepared usually by adding tepid water to wheat flour and well kneading, and after conducting extrusion molding or punching molding, drying it, and boiling prior to consumption Hitherto, various kinds of instant alimentary pastes are put on the market, but with respect to macaronis of fine quality, there have never been obtained instant macaronis which do not descrease flavor, texture, color tone, etc. at the time of having been boiled. Instant alimentary pastes are usually prepared by freeze-drying of boiled alimentary paste, and the drying step is particularly important and has a delicate influence on taste and texture such as pleasantness to teeth and tongue or elasticity. Also, there are problems that in addition that the freeze-drying requires a long time in drying, the surface of the boiled alimentary pastes is easy to hard and as a result, the rehydration time of the obtained instant alimentary pastes becomes long and moreover flavor and texture are impaired.

DISCLOSURE OF INVENTION

The present inventor has found that there can be obtained instant macaronis capable of easily rehydrating in a short period of time without impairing flavor, texture, color tone, etc. and moreover freeze-drying time can be remarkably shortened, when instant macaronis are prepared by adding an aqueous solution of a carbonate, egg white and a yam to a wheat flour, half-kneading and aging the mixture, further adding a kneading water containing an edible acid thereto and kneading, molding into a desired shape, boiling the moldings in a 2 to 4% by weight aqueous solution of common salt, surface-treating with a solution of glucose in an alcohol-water mixed solvent and then conducting freeze-drying.

As a wheat flour, semolina of durum wheat or a wheat flour having a large content of gluten is prefered, and then may be employed in admixture.

In order to make a wheat flour, which is originally weakly acidic, weakly basic so as to improve the viscoelasticity, egg white and a yam are added to the wheat flour. Although it is known to employ a yam as an improver for raising taste, texture, foaming property and appearance, these effects are further synergistically increased when a yam is employed in combination with the egg white. A dried egg white powder and a dried yam powder which are obtained by freeze-drying are usually employed as an egg white and a yam. The amount of each of the egg white and yam added is usually selected from 0.2 to 0.4% by weight (dry weight basis) based on the wheat flour. Of course, raw egg white and raw yam may be employed. Further, a yolk lecithin powder may be employed as an improver, and it improves the uniformity and stability in quality, flavor and texture and also serves for pH adjustment as well as egg white and yam. The yolk lecithin powder is employed in an amount of 0.1 to 0.5% by weight based on the wheat flour.

In the present invention, an aqueous solution of a carbonate is employed as a first kneading water in an amount of about 15 to 25% by weight based on the wheat flour. As an amount of a carbonate used, about half of a conventional amount used is sufficient, and the carbonate is usually employed in an amount of 0.2 to 0.4% by weight based on the wheat flour. Any of conventionally used carbonates are usable, and for instance, there are mentioned sodium carbonate, potassium carbonate, magnesium carbonate, calcium carbonate, calcium hydrogencarbonate and the like. Especially, sodium carbonate is preferably employed. It is desirable that the pH of the first kneading water is in the vicinity of 8.5. An aqueous solution of a carbonate in which an egg white powder and a yam powder are dissolved may be employed as a first kneading water.

It is one of the features of the present invention that the amount of a carbonate used is about half of a conventional amount used and the viscoelasticity of an alimentary paste is improved by combination use of a yam and egg white.

The thus prepared kneading water is mixed with a wheat flour, and they are kneaded and aged. In this state, the amount of water is not sufficient and, therefore, the dough is in the half-kneaded state.

Next, an aqueous solution which is obtained by adding about 0.2 to 0.4% by weight of an edible acid based on the wheat flour to water of about half the amount of the first kneading water, is employed as a second kneading water. It is admixed with the abovementioned raw material in the half-kneaded state that the aging has been completed, and thoroughly kneaded. The dough obtained by the addition of the second kneading water followed by thorough kneading becomes weakly acidic near pH 7. The lower the temperature of the aqueous solution of an edible acid, the better in points of improving the transparency of an alimentary paste. However, when the temperature is too low, there is a possibility of accelerating conversion of $\alpha$-starch into $\beta$-starch, and accordingly the vicinity of 5° to 6° C. is preferable. The kneading is carried out in a usual manner. It is desirable that the obtained dough is at highest in the vicinity of 80° C. The edible acid employed in the present invention includes succinic acid, lactic acid, phosphoric acid, citric acid, malic acid and the like, and in particular lactic acid is preferably employed.

It is also one of the important features of the present invention to, as mentioned above, prepare a dough which is weakly acidic near pH 7 by neutralizing with an aqueous solution of an edible acid and thoroughly kneading, after aging in the half-kneaded state. By the neutralization of a carbonate included in the first kneading water and an edible acid included in the second kneading water, fine foams generate, whereby the pore structure which is a significant factor for rehydration time of instant foods is formed in the dough. Also, since the dough is adjusted to near pH 7, the transparency characteristic of alimentary pastes of fine quality is revealed and simultaneously the optimum flavor as foods can be obtained.

The obtained dough is molded into a desired form in accordance with a usual method, that is to say, in case of macaroni, into a tubular form of 2.79 to 6.86 mm. in diameter; in case of spaghetti, into a tubular or cylindrical form of 1.52 to 2.79 mm. in diameter; in case of vermicelli, into a cylindrical form of not more than 1.52 mm. in diameter; in case of noodle, into a ribbon form; and the like. In case of shaping into a cylindrical form, it is desirable to make tubular form by providing a hollow at the center portion.

The raw alimentary paste after the molding usually has a water content of about 25 to 30% by weight. It is boiled in a boiling water containing about 2 to 4% by weight of common salt to give a boiled alimentary paste. Although the boiling time varies depending on the diameter or the form of the molded raw alimentary paste, the boiling is conducted usually in a boiling water of 95° to 100° C. for 8 to 15 minutes. In the boiled alimentary paste so obtained, not less than 80% of the starch is in the state of $\alpha$-starch. It is also one of the features of the present invention that the concentration of common salt is higher as compared with a conventional process. Common salt has an effect of strengthening the alimentary paste and an effect of accelerating conversion into $\alpha$-starch (gelatinization). Although a higher concentration of common salt is preferable, the concentration of common salt exceeding about 4% by weight is not preferable, since the alimentary paste is extremely shrinked and water to be absorbed is squeezed out. It is generally said that the water content of a boiled alimentary paste is desirably not less than 60% by weight. However, in the process of the present invention, the water content of the boiled alimentary paste is about 40 to 60% by weight, and even in such a state, it has a texture characteristic of macaronis of fine quality and moreover the conversion into $\alpha$-starch reaches not less than 80% which is the same degree as common alimentray pastes. Since the water content of the boiled alimentary paste in the process of the present invention is lower than that in a conventional process, the drying time is remarkably shortened as compared with a conventional process.

This boiled alimentray paste is surface-treated with a solution of glucose which is dissolved in an alcohol-water mixed solvent in a concentration of about 2 to 4% by weight, for the purpose of preventing hardening of the surface by vaporization of water in the surface in cooling, air-drying or freeze-drying and also preventing the conversion of starch into $\beta$-starch. When the concentration of glucose is more than 4% by weight, flavor of the alimentary paste is impaired, and when the concentration is less than 2% by weight, the effect is not sufficiently exhibited. The surface treatment with glucose is also one of the significant features of the present invention. In addition that glucose forms a protective layer on the surface of the boiled alimentary paste so as to prevent hardening of the surface layer portion of the boiled alimentary paste upon freeze-drying, this surface treatment also exhibits an effect of shortening the drying time, since an alcohol penetrates into the inside of the alimentary paste and accelerates evaporation of water upon drying. It is preferable that the weight ratio of an alcohol to water in the mixed solvent is 1 to 2:1. Ethanol, particularly ethanol for food is preferably employed as an alcohol from the viewpoint of food sanitation. The surface treatment is carried out by a process such as coating, dipping or spraying.

The surface-treated boiled alimentary paste is then dried by conducting freeze-vacuum drying according to a usual manner to obtain instant macaronis. Usually, the drying is carried out such that the water content of end products becomes about 10% by weight. Prefreezing may be suitably carried out before freeze-vacuum drying, and in that case, when the boiled alimentary paste is cooled rapidly in 30 minutes after the boiling up in an environment of $-40°$ C. (at this time, it is preferable to simultaneously conduct drying by cold air), the water content at the time of starting the freeze-vacuum drying is decreased to about 35 to 55% by weight. Therefore, the freeze-vacuum drying time necessary for bringing the remaining water to about 10% by weight can be shortened to about 10 hours.

The instant macaronis obtained by the process of the present invention can be easily rehydrated by merely pouring boiling water on the macaronis. No more than 5 minutes suffice for the rehydration, and the rehydration time is remarkably shortened as compared with the rehydration time of conventional instant macaronis which require not less than 10 minutes.

As stated above, according to the process of the present invention, by freeze-drying of alimentary pastes in which pore structure is formed by neutralization, it is possible to advantageously prepare instant macaronis, which have not been obtained heretofore, capable of rehydrating in a short peroid of time without impairing flavor, texture, color tone, etc.

BEST MODE FOR CARRYING OUT THE INVENTION

The process of the present invention will be explained by means of Examples. However, it is to be understood that the present invention is not limited by these Examples.

EXAMPLE 1

To 10 kg. of a wheat flour consisting of 85% by weight of a hard wheat flour (commercial name "Ocean", product of Nisshin Flour Milling Co., Ltd.) and 15% by weight of a medium wheat flour (commercial name "Yuki", product of Nisshin Flour Milling Co., Ltd.) were added 30 g. of a yam powder and 30 g. of an egg white powder, and thereto was further added about 2 liters of an aqueous solution containing 30 g. of sodium carbonate and they were thoroughly kneaded for about 20 minutes. After aging for about 20 minutes, about 1 liter of an aqueous solution containing 30 g. of lactic acid which was cooled to 6° C. was added to the mixture, and was thoroughly kneaded for about 30 minutes. The obtained mixture was pH 6.8 and the temperature was about 78° C. It was molded into a spaghetti of about 2 mm. in diameter by a usual extrusion molding machine, and was added to a boiling water (95° to 96° C.) of 3% by weight in concentration of common salt and boiled for about 8 minutes to give about 25 kg. of a boiled alimentary paste in which not less than 80% of starch was in the state of $\alpha$-starch and which had a water content of about 60% by weight.

Onto the obtained boiled alimentary paste was sprayed 250 g. of a 3% by weight aqueous solution of glucose dissolved in a water-ethanol mixed solvent (1:1 by weight). The surface-treated alimentary paste was then freeze-dried according to a usual method to give an instant spaghetti.

This instant spaghetti could be rehydrated by pouring a boiling water and allowing to stand for about 5 minutes, and the spaghetti had excellent taste, texture and color tone.

EXAMPLE 2

To 10 kg. of a hard wheat flour (commerical name "Ocean," product of Nisshin Flour Milling Co., Ltd.) was added 30 g. of a yolk lecithin powder. On the other hand, a first kneading water was prepared by dissolving 30 g. of sodium carbonate in about 2 liters of water and further dissolving in the obtained aqueous solution 30 g. of an egg white powder and 30 g. of a yam powder. The pH of the first kneading water was about 8.5. The first kneading water was added to the above-mentioned wheat flour, and after thoroughly kneading, the mixture was aged for about 20 minutes. To the mixture was then added a second kneading water (temperature: about 5° C.) obtained by dissolving 30 g. of succinic acid in about 1 liter of water, and further thoroughly kneaded to give a kneaded matter of pH 6.9. The temperature of the kneaded matter was about 80° C. The kneaded matter was molded into a macaroni of about 0.5 mm. in diameter by a usual extrusion molding machine, and was boiled in a boiling water containing 3% by weight of common salt for about 15 minutes to give a boiled alimentary paste having a water content of about 55%.

Onto the obtained boiled alimentary paste was sprayed 125 g. of a 3% by weight solution of glucose dissolved in a water-ethanol mixed solvent (1:1 by weight) to conduct the surface treatment. The surface-treated alimentary paste was then freeze-dried according to a usual method to give an instant macaroni.

This instant macaroni could be rehydrated to macaroni having excellent taste, texture and color tone by pouring a boiling water and allowing to stand for about 5 minutes.

I claim:

1. A process for preparing instant macaronis which comprises adding an aqueous solution of a carbonate as a first kneading water, an egg white and a yam to a wheat flour, said carbonate, egg white and yam being present in the amount of 0.2 to 0.4% by weight based on the dry weight of said wheat flour; half-kneading the resulting mixture; aging the half-kneading mixture; adding an aqueous solution of an edible acid as a second kneading water to the aged mixture and kneading it, said acid being present in the amount of 0.2 to 0.4% by weight based on the dry weight of said wheat flour; molding the mixture into a desired shape; boiling the obtained alimentary paste in a 2 to 4% by weight aqueous solution of common salt; surface-treating the resulting boiled alimentary paste with a solution of about 2 to 4% by weight of glucose dissolved in an alcohol-water mixed solvent; and freeze-drying the surface-treated alimentary paste.

2. The process of claim 1, wherein said carbonate is a member selected from the group consisting of sodium carbonate, potassium carbonate, magnesium carbonate, calcium carbonate and calcium hydrogen-carbonate.

3. The process of claim 1, wherein said acid is a member selected from the group consisting of succinic acid, lactic acid, phosphoric acid, citric acid and malic acid.

4. The process of claim 1, wherein the pH of the carbonate solution is about 8.5.

5. The process of claim 1, wherein the dough obtained after kneading is weakly acidic near pH 7.

* * * * *